Patented July 7, 1936

2,046,375

UNITED STATES PATENT OFFICE 2,046,375 p-HALOGEN-o-ALKOXY-ANILINE DERIVATIVES AND PROCESS OF PREPARING THE SAME

Richard Frank Goldstein, Sedgley Park, Prestwich, and Wilfred Archibald Sexton, Gledholt, Huddersfield, England, assignors to Imperial Chemical Industries Limited, a corporation of Great Britain No Drawing. Application May 24, 1932, Serial No. 613,266. In Great Britain June 4, 1931

14 Claims. (Cl. 260—125)

This invention relates to organic halogen compounds, more particularly phenyl derivatives having an alkoxy group and a halogen respectively para and ortho to an amine nitrogen in the phenyl nucleus, and a process for the manufacture thereof.

It is an object of the invention to provide a new and improved process for producing phenyl derivatives having an alkoxy group and a halogen respectively para and ortho to an amine nitrogen in the phenyl nucleus. Further objects are the production of N,N'-di-(ortho-halo-para-alkoxy-phenyl) ureas and ortho-halo-para-alkoxy anilines. Another object is the production of these compounds by a series of reactions which proceed smoothly and with the formation of little if any isomeride. Other objects will appear hereinafter.

These objects are accomplished according to the invention whereby: (1) di-para-alkoxy-N,N'-di-phenyl ureas having the positions in the phenyl nuclei ortho to the amine nitrogens unsubstituted are reacted with a halogenating agent; and (2) the halogenated product is treated with a hydrolyzing agent.

The process of the invention is very highly advantageous in the production of N,N'-di-(ortho-halo-para-alkoxy-phenyl) urea and ortho-halo-para-alkoxy-aniline.

The invention will be illustrated but is not limited by the following examples in which the parts are by weight.

Example I

Ninety parts of symmetrical di-p-phenetyl urea prepared in any suitable manner, for example, by the method described by Gattermann and Cantzler (Ber. 1892, 25, 1090), are agitated with 375 parts of tetrachlorethane and the mixture is heated to about 40° C. Thereafter about 86.4 parts of sulfuryl chloride are added slowly. The suspended solid gradually dissolves, hydrogen chloride is evolved and finally the solid matter separates. The temperature is raised to 50° C. and agitation continued until evolution of gas has ceased. About 100 parts of water are added to destroy the excess sulfuryl chloride and the liquor is made just alkaline by the addition of sodium carbonate. The tetrachlorethane is removed by steam distillation and the residual solid filtered from the water. The yield is about 94.6% of theory and the product has a melting point of about 221–223° C.

A quantity of the product thus obtained as a wet paste, equivalent to 155 parts of dry dichloro-p-phenetyl urea, 90 parts of aqueous ammonia (specific gravity 0.880) and 270 parts of water are mixed together and heated in an autoclave to 150° C. in two hours. The temperature is kept at 148–150° C. for five hours. The autoclave is cooled and the contents filtered. The oil is separated from the aqueous liquor. This oil is almost pure 3-chloro-p-phenetidine. When the crystalline hydrochloride is decomposed the free base obtained has a melting point of about 22–23° C. The melting point of the acetyl derivative is about 97° C.

Example II

Sixty parts of symmetrical di-p-phenetyl urea are agitated with 320 parts of tetrachlorethane and a mixture of 70 parts of bromine and 50 parts of tetrachlorethane is added during about one half hour. A purple color is produced when bromination commences, giving place to brown after a time. Hydrogen bromide is evolved and the temperature rises. When all the bromine has been added the mixture is gently boiled until no more hydrogen bromide is evolved. On cooling, a solid slowly separates.

To the product obtained as described above, 100 parts of water is added, followed by enough sodium carbonate to render the mixture alkaline. The tetrachlorethane is then removed by steam distillation. The still residue consists of a suspension which is filtered to give the solid, dibromo-4,4'-dialkoxy-diphenyl urea.

Eighty four parts of this dibromo-4,4'-dialkoxy-diphenyl urea, 136 parts of aqueous ammonia (specific gravity 0.890) and 136 parts of water are mixed and heated in an autoclave at 150° C. for 5 hours. When the contents are cooled the oil is separated and is purified by vacuum distillation. This oil is the hitherto undescribed 3-bromo-p-phenetidine (b. p. 160° C. at 23 mm).

Example III

One hundred thirty-six parts of symmetrical di-p-anisylurea (which may be made by the method of Pieschel, Liebig's Annalen, 1875, 175, 312, or by passing phosgene into p-anisidine in the presence of an alkali carbonate) are suspended in about 1000 parts of tetrachlorethane at 45° C. To the agitated suspension is added about 145 parts of sulfuryl chloride in approximately two and one quarter hours. The suspended solid gradually dissolves and hydrogen chloride is evolved. The temperature is maintained at about 55° C. for one hour, then raised to 90° C. in one hour and held for one-half hour. As the reaction proceeds a solid comes out of solution. When no more hydrogen chloride is evolved the reaction mixture is cooled to 15° C. and the chlorinated product is removed by filtration.

Approximately 136 parts of the forgoing chlorinated urea together with 296 parts of aqueous ammonia (specific gravity 0.880) and 296 parts of water are stirred in an autoclave and heated to a temperature of 150° C. in three hours. The temperature is maintained at 148 to 152° C. for four and one-half hours. The pressure being the autogenous pressure of the reactants which is about 140–170 pounds per square inch. On cooling the contents of the autoclave are filtered and the oil separated. The yield of oil amounts to about 117 parts and on distillation in vacuum gives a colorless oil having a boiling point of about 165–173° C. at 35 mm. This is 3-chloro-p-anisidine as shown by conversion to its acetyl derivative, m. p. 114° C.

The reactions described in the foregoing examples may be represented in general as follows: Alk in the foregoing equations representing an alkyl radical and X representing a halogen, preferably chlorine or bromine.

As indicated by the examples the halogenation is preferably effected in the presence of a suitable liquid medium such as tetrachlorethane. Other suitable media are any other solvent or suspension media which are liquid at the reaction temperature and are inert or do not affect the reaction unfavorably. As further examples of such media we may mention carbon tetrachloride and ethylene dichloride.

In practising the invention any halogenating agent favorable to the introduction of a halogen atom into the positions ortho to the amino groups of the diphenyl urea may be employed. In producing chlorinated diphenyl ureas in accordance with the invention especially desirable results have been obtained by employing sulfuryl chloride as a chlorinating agent.

According to the preferred method of procedure the proportions of halogenating agent employed should be sufficient to introduce one halogen atom into each phenyl nucleus of the diphenyl urea. Thus, when sulfuryl chloride or bromine is the halogenating agent employed the proportions thereof should preferably correspond to about two moles per mole of diphenyl urea.

While the hydrolysis is preferably conducted in solution by means of aqueous ammonia, it may be effected by means of any hydrolyzing agent favorable to the breaking of the carbon-nitrogen linkage of the group $$-\underset{\underset{H}{|}}{N}-\underset{\underset{O}{\|}}{C}-\underset{\underset{H}{|}}{N}-$$

When ammonia is employed as a hydrolyzing agent it is desirable to effect the hydrolysis at an elevated temperature and pressure. As examples of other hydrolyzing agents may be mentioned sodium hydroxide and potassium hydroxide. It will be understood that the procedure adopted in the hydrolysis may vary widely with different ureas.

The temperature employed in treating the di-(p-alkoxyphenyl) urea with a halogenating agent may vary within relatively wide limits depending upon the particular compound treated and the nature of the halogenating agent, but in general should preferably be relatively low and in any case below the decomposition temperature of the reactants and products. Very advantageous results have been obtained by operating this step of the process at temperatures of about 40–55° C.

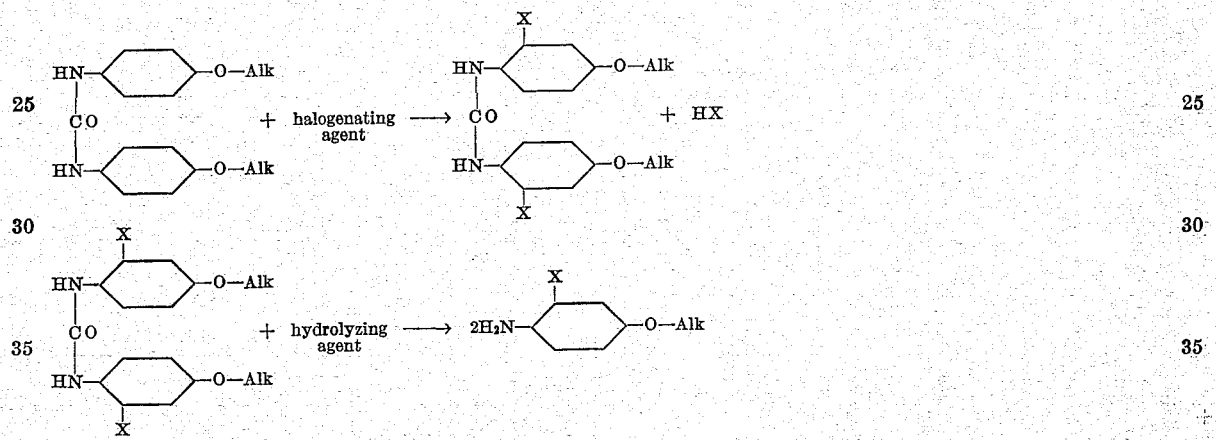

The temperature of the hydrolysis is also subject to considerable variation depending largely upon the compound to be hydrolyzed and the specific hydrolyzing agent employed. With ammonia as the hydrolyzing agent very desirable results have been obtained by employing temperatures of about 145–150° C., it being understood, however, that the hydrolytic action proceeds at higher or lower temperatures. The pressure employed may be varied widely but is preferably the autogenous pressure of the reaction mixture.

The invention is particularly advantageous in that the ortho-halo-p-alkoxy anilines are obtained substantially free from isomerides. That a 2-substituted derivative of a p-alkoxy aniline is obtained in accordance with our invention is very surprising, since Bargellini (cf. Chemisches Zentralblatt, 1931, I, 2459) has said that if a derivative of p-aminophenol in which the hydroxy-group is alkylated and the amino-group is acetylated, is halogenated, then the first halogen atom enters in the ortho-position to the alkoxy-group (cf. also Orton and King, Journal of the Chemical Society, 1911, 99 1190, corrected by Hurst and Thorpe, ibid., 1915, 107, 935).

The products are valuable in the chemical industry, particularly as intermediates for the production of dyes.

As many apparent and widely different embodiments of this invention may be made without departing from the spirit thereof, it is to be understood that we do not limit ourselves to the

We claim:

1. In the manufacture of phenyl derivatives having an alkoxy group and a halogen respectively para and ortho to an amine nitrogen in the phenyl nucleus, the step which comprises reacting a di-p-alkoxy N,N'-di-phenyl urea having the positions in the phenyl nuclei ortho to the amine nitrogens unsubstituted, with a halogenating agent.

2. The process of producing an ortho-halogen-para-alkoxy-aniline, which comprises reacting a compound having the following general formula

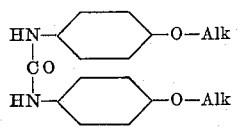

in which Alk represents an alkyl radical, with substantially the theoretical quantity of a halogenating agent calculated to introduce one halogen atom into each phenyl nucleus, and treating the resulting product with a hydrolyzing agent.

3. The process of producing a di-ortho-halogen-di-para-alkoxy-diphenyl-urea, which comprises reacting a compound having the following general formula

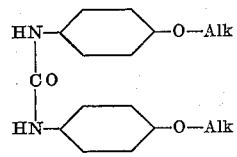

in which Alk represents an alkyl radical, with substantially the theoretical quantity of a halogenating agent calculated to introduce one halogen atom into each phenyl nucleus.

4. The process of producing 3-chloro-para-phenetidine which comprises heating symmetrical di-p-phenetyl urea with sulfuryl chloride in proportions corresponding to about two moles of sulfuryl chloride per mole of di-p-phenetyl urea, in a suitable liquid medium, at a temperature of about 40 to about 55° C. until the evolution of hydrogen chloride ceases, and hydrolyzing the resultant symmetrical dichloro-p-phenetyl urea by treating it with aqueous ammonia under autogenous pressure and at a temperature of about 148 to about 150° C.

5. A process for preparing an ortho-halogen-para-alkoxy-aniline, which comprises reacting with a halogenating agent upon the corresponding symmetrical di-p-alkoxy-diphenyl-urea, and hydrolyzing the resulting di-ortho-halogen-di-p-alkoxy-diphenyl-urea in alkaline medium.

6. A process as in claim 5, the hydrolysis being effected by the aid of aqueous ammonia at a temperature of about 145 to about 150° C. and under the autogenous pressure of the reaction mixture.

7. A process as in claim 5, the hydrolysis being effected by the aid of aqueous ammonia.

8. A process for preparing an ortho-chloro-para-alkoxy-aniline, which comprises reacting with sulfuryl-chloride upon a di-para-alkoxy-N,N'-diphenyl-urea suspended in an inert organic liquid, and hydrolyzing the resulting dichloro-dialkoxy-N,N'-diphenyl-urea.

9. A process for preparing an ortho-bromo-para-alkoxy-aniline, which comprises reacting with bromine upon a di-para-alkoxy-N,N'-diphenyl-urea suspended in an inert organic liquid, and hydrolyzing the resulting dibromo-dialkoxy-N,N'-diphenyl-urea.

10. A process for preparing an organic compound, which comprises reacting with a halogenating agent upon a di-p-alkoxy-N,N'-diphenyl-urea, suspended in an inert organic liquid medium.

11. A process for preparing an organic compound, which comprises reacting with a chlorinating agent upon a di-p-alkoxy-N,N'-diphenyl-urea suspended in tetrachlorethane.

12. A process for preparing an organic compound, which comprises reacting with bromine upon a di-p-alkoxy-N,N'-diphenyl-urea, suspended in tetrachlorethane.

13. A compound which, in the form of a free base, corresponds to the formula

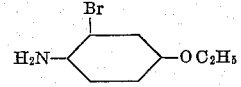

14. 2,2'-dibromo-4,4'-diethoxy-N,N'-diphenyl-urea.

RICHARD FRANK GOLDSTEIN.
WILFRED ARCHIBALD SEXTON.